US012620280B2

(12) United States Patent
Lee

(10) Patent No.: US 12,620,280 B2
(45) Date of Patent: May 5, 2026

(54) VEHICLE DATA VERIFICATION APPARATUS AND METHOD THEREOF

(71) Applicants: HYUNDAI MOTOR COMPANY, Seoul (KR); KIA CORPORATION, Seoul (KR)

(72) Inventor: Min Seob Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 415 days.

(21) Appl. No.: 18/142,875

(22) Filed: May 3, 2023

(65) Prior Publication Data

US 2024/0096149 A1 Mar. 21, 2024

(30) Foreign Application Priority Data

Sep. 16, 2022 (KR) ........................ 10-2022-0117348

(51) Int. Cl.
*G07C 5/08* (2006.01)
*G07C 5/00* (2006.01)

(52) U.S. Cl.
CPC ......... *G07C 5/0841* (2013.01); *G07C 5/0816* (2013.01); *G07C 5/008* (2013.01)

(58) Field of Classification Search
CPC .. G07C 5/0816; G05B 23/02; G05B 23/0218; G05B 23/0224
See application file for complete search history.

(56) References Cited

U.S. PATENT DOCUMENTS

| | | | | |
|---|---|---|---|---|
| 6,542,799 | B2 | 4/2003 | Mizutani et al. | |
| 6,721,888 | B1 * | 4/2004 | Liu | G06F 21/52 726/1 |
| 10,023,164 | B2 | 7/2018 | Schwindt et al. | |
| 2004/0167689 | A1 | 8/2004 | Bromley et al. | |
| 2016/0171793 | A1 * | 6/2016 | Kim | G06F 16/335 701/33.4 |
| 2020/0216083 | A1 | 7/2020 | Kawasaki et al. | |
| 2020/0410788 | A1 * | 12/2020 | Uchiyama | G01M 17/007 |

FOREIGN PATENT DOCUMENTS

| | | | | | |
|---|---|---|---|---|---|
| CN | 112732558 | A | * | 4/2021 | G06F 11/3684 |
| CN | 113533872 | A | * | 10/2021 | G01R 31/007 |
| CN | 108345511 | B | * | 2/2022 | G06F 11/0763 |
| CN | 112463042 | B | * | 8/2022 | G06F 3/0653 |
| CN | 110516258 | B | * | 12/2022 | |

(Continued)

OTHER PUBLICATIONS

CN 108345511 B—machine translation (Year: 2022).*

(Continued)

*Primary Examiner* — Dino Kujundzic
(74) *Attorney, Agent, or Firm* — Lempia Summerfield Katz LLC

(57) ABSTRACT

A vehicle data verification apparatus includes a database (DB) and a processor connected with the DB. The processor is configured to: import at least one vehicle data set; identify whether the at least one vehicle data set is stored in the DB; verify pieces of vehicle data in the at least one vehicle data set upon identifying that the at least one vehicle data set is stored in the DB; and export a result of the verification of the pieces of vehicle data.

17 Claims, 8 Drawing Sheets

(56) References Cited

FOREIGN PATENT DOCUMENTS

| | | | |
|---|---|---|---|
| JP | 2000266642 | A | 9/2000 |
| KR | 101040010 | B1 | 6/2011 |
| KR | 101388729 | B1 | 5/2014 |
| KR | 102190663 | B1 | 12/2020 |
| KR | 20210123507 | A | 10/2021 |

OTHER PUBLICATIONS

CN 110516258 B—machine translation (Year: 2022).*
CN 112463042 B—machine translation (Year: 2022).*
CN 112732558 A—machine translation (Year: 2021).*
CN 113533872 A—machine translation (Year: 2021).*
Lee, Min Seob, Development of automation program for OBD Regulations and data verification, Hyundai Motor Group Academic Conference, Oct. 7, 2022; 14 pp.

* cited by examiner

| Type | Usage example (X = value of internal variable) | Calculated result |
|---|---|---|
| Comparison operator | 0 < X < 10 | When X is greater than 0 and is less than 10, it is true. |
| | 0 ≤ X ≤ 10 | When X is greater than or equal to 0 and is less than or equal to 10, it is true. |
| | X == Y | When two values are identical to each other, it is true. |
| | X != Y | When two values are different from each other, it is true. |
| | X ~~ Y | When X and Y are approximate values, it is true. (compare by performing rounding with respect to a smaller valid number)/ {Ex} 19.9 ~~ 20 → True |
| Logical operator | Formula ① and formula ② | Both of formulas ① and ② are "True", it is true. |
| | Formula ① or formula ② | At least one of formulas ① and ② is "True", it is true. |
| Minimum/ Maximum | X.min() < 10 | When a minimum value among table values is less than 10, it is true. |
| | X.max() < 10 | When a maximum value among table values is less than 10, it is true. |
| Decimal conversion (for DTC identification) | X == int("0128", 16) | When the value converted from "0128" expressed in hexadecimal to decimal is the same as X, it is true. (DTC is generally converted and mapped to decimal. Ex) "P0128" (= 296)) |
| Curve, Map data identification | "DEve_NoUse"in X | When there is "DEve_NoUse" among X (Curve, Map) values, it is true. |
| ASCII data (CTG, VIN, or the like) | X[1] = "B" | When the 1st character of the variable value X is "B", it is true. |
| | X[1:5] = "ABCDE" | When the 1st to 5th characters of the variable value X is "ABCDE", it is true. |

FIG.5

VEHICLE DATA VERIFICATION APPARATUS AND METHOD THEREOF

CROSS-REFERENCE TO RELATED APPLICATION

This application claims the benefit of priority to Korean Patent Application No. 10-2022-0117348, filed in the Korean Intellectual Property Office on Sep. 16, 2022, the entire contents of which are incorporated herein by reference.

TECHNICAL FIELD

The present disclosure relates to a vehicle data verification apparatus and a method thereof.

BACKGROUND

When a vehicle is developed, it passes through a process of identifying and verifying vehicle data. In the process of identifying the vehicle data, the decoding and comparison of vehicle data may be performed using an INCA (Integrated Calibration and Application) tool provided by the ETAS company. However, it is difficult for existing tools to reprocess vehicle data and visualize compared results. Additionally, existing tools have low readability and are unable to visualize N data at the same time.

Furthermore, when distributing new software or partially corrected software, existing technology manually verifies the software depending on the capabilities of each functional person. In other words, a person in charge must manually review 20,000 to 40,000 vehicle data variables (or labels). Thus, in existing verification processes, it is difficult for each person in charge to review all of the pieces of vehicle data. Although each person in charge reviews only important labels, it may still take a lot of time. Furthermore, because it is difficult for existing technology to transfer know-how on data verification standards and since such data verification standards are not standardized, when a person in charge is replaced, the problems that have been improved in the past often still recur. In addition, existing technology causes frequent quality problems and certification risks due to non-compliance with regulations.

SUMMARY

The present disclosure has been made to solve the above-mentioned problems occurring in the prior art while advantages achieved by the prior art are maintained intact.

An aspect of the present disclosure provides a vehicle data verification apparatus for automatically decoding and verifying vehicle data and a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle data verification apparatus may include a database (DB) and a processor connected with the DB. The processor may import at least one vehicle data set and may identify whether the at least one vehicle data set is stored in the DB. Further, the processor may verify pieces of vehicle data in the at least one vehicle data set upon identifying that the at least one vehicle data set is stored in the DB. Furthermore, the processor may export a result of the verified pieces of vehicle data.

The processor may preprocess read-only memory (ROM) data among the pieces of vehicle data upon identifying that the at least one vehicle data set is not stored in the DB. The processor may decode pieces of vehicle data including the preprocessed ROM data, and may store the pieces of decoded vehicle data in the DB in the form of a predetermined data frame.

The processor may set one of the pieces of vehicle data to reference data and may compare the vehicle data set to the reference data for the other pieces of vehicle data.

The processor may visualize and export the pieces of vehicle data.

The processor may check a validity of the pieces of vehicle data.

The processor may import a review rule defined by a user.

The processor may review the pieces of vehicle data based on the review rule.

The processor may import failure diagnosis standard information.

The processor may review the pieces of vehicle data to generate a new review rule based on the failure diagnosis standard information.

The new review rule may include the result from the reviewed pieces of vehicle data.

According to another aspect of the present disclosure, a vehicle data verification method may include importing, by a processor, at least one vehicle data set, and identifying, by the processor, whether the at least one vehicle data set is stored in a database (DB). Additionally, the method may include verifying, by the processor, pieces of vehicle data in the at least one vehicle data set upon identifying that the at least one vehicle data set is stored in the DB, and exporting, by the processor, a result of verifying the pieces of vehicle data.

The vehicle data verification method may further include preprocessing, by the processor, read-only memory (ROM) data among the pieces of vehicle data upon identifying that the at least one vehicle data set is not stored in the DB. Furthermore, the method may include decoding, by the processor, pieces of vehicle data including the preprocessed ROM data, and storing, by the processor, the pieces of decoded vehicle data in the DB in the form of a predetermined data frame.

The verifying of the pieces of vehicle data may include setting, by the processor, one of the pieces of vehicle data to reference data and comparing, by the processor, the vehicle data set to the reference data for the other pieces of vehicle data.

The verifying of the pieces of vehicle data may further include visualizing and exporting, by the processor, the pieces of vehicle data.

The verifying of the pieces of vehicle data may further include checking, by the processor, a validity of the pieces of vehicle data.

The importing of the at least one vehicle data set may include importing, by the processor, a review rule defined by a user.

The verifying of the pieces of vehicle data may include reviewing, by the processor, the pieces of vehicle data based on the review rule.

The importing of the at least one vehicle data set may include importing, by the processor, failure diagnosis standard information.

The verifying of the pieces of vehicle data may include reviewing, by the processor, the pieces of vehicle data to generate a new review rule based on the failure diagnosis standard information.

The above information disclosed in this Background section is only to enhance understanding of the background of the disclosure. Therefore, the Background section may include information that does not form the prior art that is already known in this country to a person of ordinary skill in the art.

BRIEF DESCRIPTION OF THE DRAWINGS

The above and other objects, features, and advantages of the present disclosure should be apparent from the following detailed description taken in conjunction with the accompanying drawings:

FIG. 5 is a drawing illustrating operator information for writing a review formula according to another embodiment of the present disclosure;

DETAILED DESCRIPTION

Figure 1:
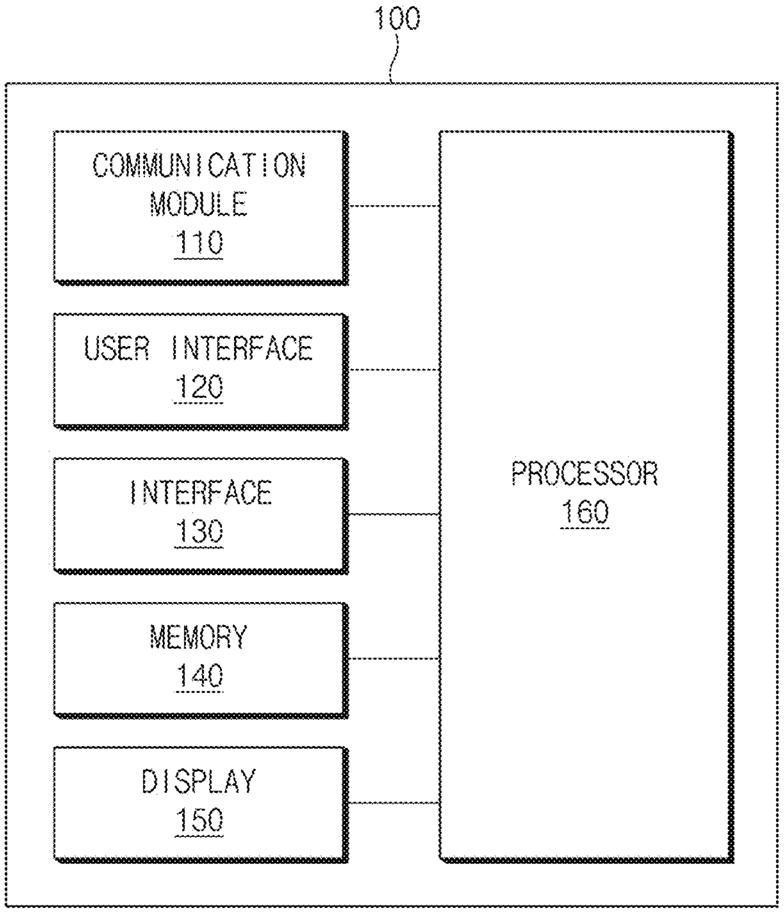
FIG. 1 is a block diagram illustrating a configuration of a vehicle data verification apparatus according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions is ruled out in order not to unnecessarily obscure the gist of the present disclosure.

In describing the components of the embodiments according to the present disclosure, terms such as first, second, "A," "B," (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a configuration of a vehicle data verification apparatus according to an embodiment of the present disclosure.

A vehicle data verification apparatus 100 may decode, compare, and/or review vehicle data. Additionally, the vehicle data verification apparatus 100 may generate a new rule file based on vehicle failure diagnosis information. The rule file may be used when vehicle data is reviewed.

Referring to FIG. 1, the vehicle data verification apparatus 100 may include a communication module 110, a user interface 120, an interface 130, a memory 140, a display 150, and a processor 160.

The communication module 110 may support wired and/or wireless communication between the vehicle data verification apparatus 100 and an external electronic device (e.g., an electronic control unit (ECU)). The communication module 110 may include a transceiver that transmits and receives information through an antenna. The communication module 110 may receive a vehicle data set transmitted from the external electronic device.

The user interface 120 may generate data (i.e., a user input) depending on the manipulation thereof by a user. The user interface 120 may be implemented as a keyboard, a keypad, a button, a switch, a touch pad, a touch screen, and/or the like.

The interface 130 may serve as a path with an external device connected with the vehicle data verification apparatus 100. The interface 130 may receive data or power from the external device and may deliver the data or the power to the respective components in the vehicle data verification apparatus 100. Alternatively, the interface 130 may deliver data in the vehicle data verification apparatus 100 to the external device. The interface 130 may receive a vehicle data set transmitted from the external device. For example, the interface 130 may include a wired/wireless data input/output (I/O) port, a memory card port, and/or the like.

The memory 140 may store a vehicle data verification tool (or a vehicle data management tool), a first library, a second library, a decode algorithm, a compare algorithm, a review algorithm, a rule edit algorithm, and/or the like. Furthermore, the memory 140 may store a vehicle data set, a database (DB), a result file, a decode history, and/or the like. Vehicle data, previous decoding of which is completed, and/or vehicle data, current decoding of which is completed, may be stored in the DB in a standardized format (or a standard format), i.e., in the form of a data frame.

The memory 140 may be a non-transitory storage medium that stores instructions executed by the processor 160. The memory 140 may include at least one storage media such as a flash memory, a hard disk, a solid state disk (SSD), a secure digital (SD) card, a random access memory (RAM), a static RAM (SRAM), a read-only memory (ROM), a programmable ROM (PROM), an electrically erasable and programmable ROM (EEPROM), an erasable and programmable ROM (EPROM), or a removable disk.

The display 150 may output visual information. The display 150 may include at least one of the display devices such as a liquid crystal display (LCD), a thin film transistorliquid crystal display (TFT-LCD), an organic light-emitting diode (OLED) display, a flexible display, a three-dimensional (3D) display, a transparent display, a head-up display (HUD), or a touch screen. The display 150 may include a sound output module, such as a speaker, which is capable of outputting audible information.

The processor 160 may control the overall operation of the vehicle data verification apparatus 100. The processor 160 may include at least one of the processing devices, such as an application specific integrated circuit (ASIC), a digital signal processor (DSP), a programmable logic device (PLD), a field programmable gate array (FPGA), a central processing unit (CPU), a microcontroller, or a microprocessor.

The processor 160 may execute the vehicle data verification tool depending on a user input received from the user interface 120. The processor 160 may output a screen where the vehicle data verification tool is executed on the display 150. The processor 160 may verify vehicle data using the vehicle data verification tool.

The processor 160 may receive at least one vehicle data set as an input data set from the communication module 110, the interface 130, or the memory 140. Each of the at least one vehicle data set may include pieces of vehicle data generated in a file format such as a ROM, a DAMOS container module (DCM), comma-separated values (CSV), and/or a CDFX. In other words, each vehicle data set may include ROM data, DCM data, CSV data, CDFX data, and/or the like. The ROM data may refer to all vehicle data input to a vehicle controller (e.g., an engine control unit (ECU), a transmission control unit (TCU), a hybrid control unit (HCU), a vehicle control unit (VCU), or the like). The ROM data may be a data file stored in the ROM in the vehicle controller, which may be configured with an A2L file and a HEX (or S19) file. The A2L file may be an ASAP2 electronic control unit (ECU) description file developed by the ASAM MCD-2MC (ASAP2), which may include parameters associated with the ECU, characteristic curves and maps, real measurement variables, virtual measurement variables, or variant dependencies. The HEX file may be a hexadecimal source file, which may be stored in a binary format or a text format. The A2L file and the HEX file should be coupled to each other to decode ROM data. The CSV data is a file including comma-separated values. The DCM data is a file stored in a data conservation format, i.e., a DAMOS format used in ASCET, INTECRIO, and INCA. The CDFX data is a file with an extended calibration data format, including a development state of each label and a previous change history.

When at least one vehicle data set is imported to the vehicle data verification tool, the processor 160 may identify whether there is a history where the at least one imported vehicle data set was previously decoded. The processor 160 may identify whether there is at least one vehicle data set in the DB and may determine whether there is a history where the at least one vehicle data set was previously decoded depending on the identified result. For example, when the at least one vehicle data set is stored in the DB in the memory 140, the processor 160 may determine that there is a history where the at least one vehicle data set was previously decoded. Furthermore, when the at least one vehicle data set is not stored in the DB in the memory 140, the processor 160 may determine that there is no history where the at least one vehicle data set was previously decoded.

When there is no history where the at least one imported vehicle data set was previously decoded, the processor 160 may identify a file format and/or a file path of pieces of vehicle data included in the at least one vehicle data set to generate a file list.

The processor 160 may decode a vehicle data file in the generated file list. In other words, the processor 160 may decode vehicle data (or a vehicle variable) in the at least one vehicle data set. The processor 160 may decode ROM data, DCM data, CSV data, and/or CDFX data using the first library. A process of preprocessing the ROM data may be required to decode the ROM data. In the preprocessing process, the processor 160 may calculate a plurality of predetermined functions for the ROM data and may merge (or synthesize) the calculated result values. In other words, the processor 160 may couple (or match) pieces of information that are not specified in each of the A2L file and the HEX file by the preprocessing process. The processor 160 may decode the information (i.e., the ROM data) coupled in the preprocessing process.

The processor 160 may export the result of the decoded vehicle data in the form of a data frame. The processor 160 may merge the result of the decoded ROM data, the result of the decoded DCM data, the result of the decoded CSV data, and/or the result of the decoded CDFX data to generate a data frame. The processor 160 may store the generated data frame in the DB in the memory 140. The data frame may have a predetermined standard format, which may include a vehicle variable, a variable description, a variable type, a variable function classification (function), a variable value (which refers to an internal table value for two dimensions or more), a variable unit, an X-axis value (which is limited to CURVE, MAP, or CUBOID), an X-axis unit, a Y-axis value (which is limited to CURVE, MAP, or CUBOID), a Y-axis unit, and/or the like.

The processor 160 may perform a compare function, a review function, and/or a rule generation function included in the second library based on the pieces of decoded vehicle data (i.e., data frame).

The processor 160 may perform a comparison between the pieces of decoded vehicle data using the compare function. As an example, when two or more pieces of vehicle data are imported, i.e., when two or more vehicle data files are imported, the processor 160 may compare two or more pieces of data. As another example, when one piece of vehicle data is imported, i.e., when a single vehicle data file is imported, the processor 160 may output the result of the decoded one vehicle data. As another example, the processor 160 may visualize (e.g., graph) vehicle data and may check the validity of the vehicle data.

The processor 160 may review (or verify) the pieces of decoded vehicle data using the review function (or the automatic verification function). The processor 160 may review the pieces of decoded vehicle data based on a review rule defined in the rule file. The processor 160 may export the result (e.g., pass and fail) of the reviewed pieces of vehicle data decoded according to the review algorithm and the vehicle data (or the vehicle variable or a vehicle data variable) in the rule file.

The processor 160 may automatically generate a rule file using the rule generation function. The processor 160 may generate a rule file based on a diagnostic trouble code (DTC) file having vehicle failure diagnosis information. When it is possible to reuse the generated rule file, it may include a review result based on a newly defined rule.

Figure 2:
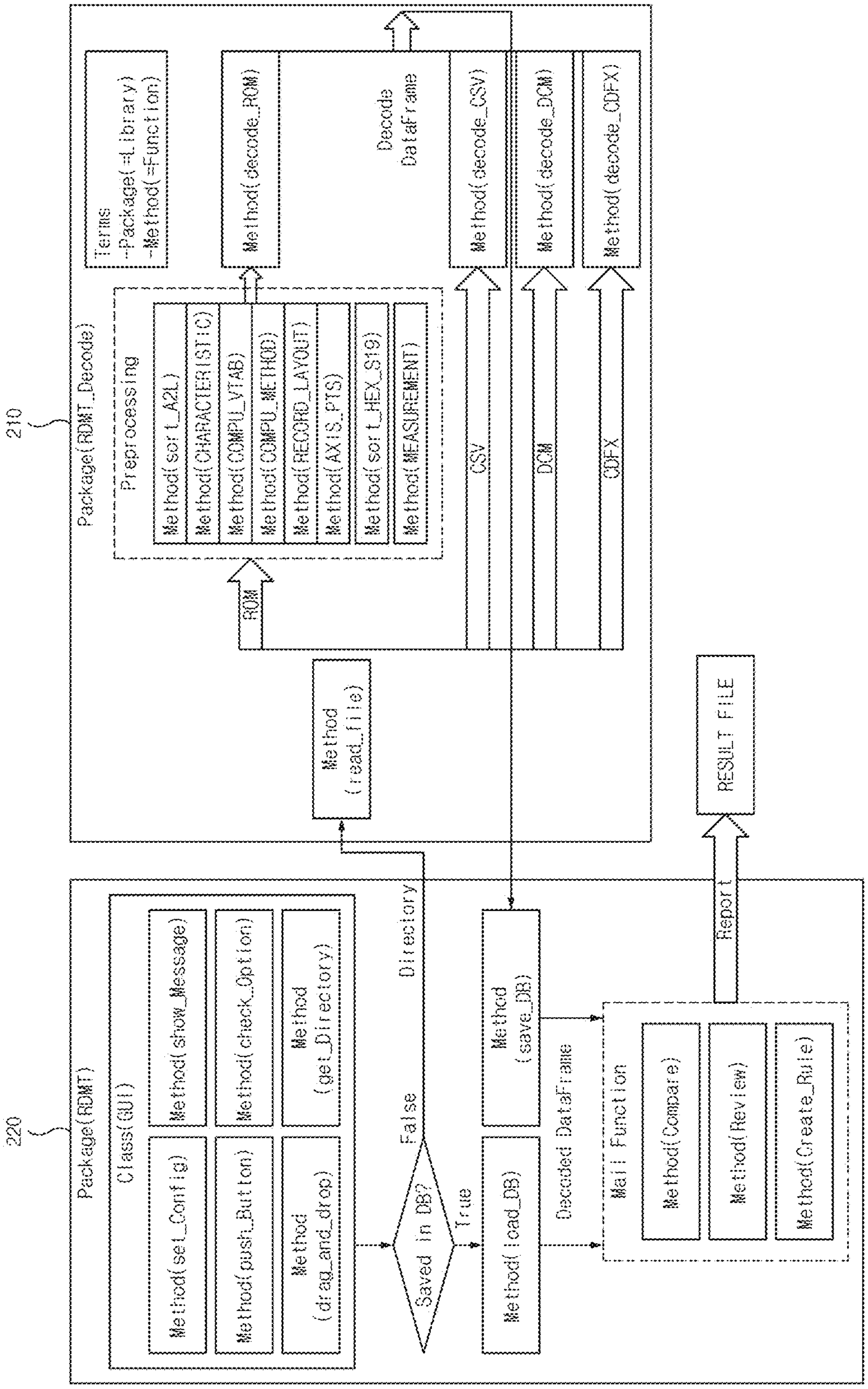
FIG. 2 is a drawing illustrating a library structure of a vehicle data verification tool according to an embodiment of the present disclosure.

FIG. 2 is a drawing illustrating a library structure of a vehicle data verification tool according to an embodiment of the present disclosure.

As shown in FIG. 2, the vehicle data verification tool may include two libraries (or packages), i.e., a first library 210 and a second library 220.

The first library 210 may include a vehicle data decode function (hereinafter, referred to as a "decode function") capable of decoding all types of vehicle data formats. The decode function may be made up of a file read process, a preprocessing process, and a decode process. A processor 160 of FIG. 1 may read a vehicle data list to be decoded in the file read process. The processor 160 may preprocess ROM data among pieces of vehicle data in the preprocessing process. In the preprocessing process the processor 160 may read ROM data using a read function (e.g., a sort function). For example, the processor 160 may read an A2L file using a sort_A2L function to classify data for each item and may select and export pieces of data necessary to decode a predefined vehicle variable among the pieces of classified data in the form of a dictionary. The processor 160 may read a HEX(S19) file using a sort_HEX_S19 file and may export a data address and value (HEX) in the form of a dictionary (e.g., {'0X0000001':A0, '0X0000002':84 . . . }). Next, the processor 160 may process pieces of data exported by the sort A2L function using functions (e.g., COMPU_VTAB, COMPU_METHOD, RECORD_LAYOUT, and AXIS_PTS) that arrange and process the pieces of data. Herein, the COMPU_VTAB function may export predefined 1:1 correspondence value information (e.g., {1:"100", 2:"50", or 3:"10"}) rather than a formula, which is information required in the process of decoding a specific value (or a vehicle variable or vehicle data). The COMPU_METHOD function may export formula information (e.g., an equation), which is the information required in a process of decoding a specific value, and may derive a physical value through a process of obtaining a solution to a formula. The RECORD_LAYOUT function may export a description method and order information (e.g., write ahead x-axis, write ahead y-axis, a type of a value (WORD, SWORD, UWORD . . . )) of one-dimensional and two-dimensional data. The AXIS_PTS function may decode and export axis data information. Next, the processor 160 may couple the pieces of processed data using a CHARACTERISTIC function. The processor 160 may output the other MEASUREMENT variables except for the variable combined by the CHARACTERISTIC function in a state where they have variable information, but are not defined as a specific value, using the MEASUREMENT function. The values (or variable information) of the other MEASUREMENT variables are values that continuously change depending on a vehicle state. In the decode process, the processor 160 may decode the preprocessed ROM data, CSV data, DCM data, and/or CDFX data and may store the pieces of decoded vehicle data in the DB in the form of a data frame.

The second library 220 may include a graphic user interface (GUI) and a main function. The GUI may be made up of a set_Config function, a push_Button function, a drag_and_drop function, a show_Message function, a check_Option function, and/or a get_Directory function. The set_Config function may store and load previous execution information. The push_Button function may output (or display): file addition, removal, and resetting; an execution pause and stop button; and/or a progress situation. The drag_and_drop function may be a function for the convenience of a user, which may import files in a drag_and_drop manner without the necessity of directly importing a file path. The show_Message function may export various pop-up messages for each situation. The check_Option function may select whether to display an additional function before executing decoding. The get_Directory function is a function for exporting a path of the imported files.

The second library 220 may read various pieces of user selection and requirement information based on the GUI. The second library 220 may import vehicle data depending on a user input and may identify whether there is a history where the vehicle data was previously decoded. This is to remove the time taken to decode the same vehicle data again.

The second library 220 may include a main function such as a compare function, a review function, and/or a rule generation function. The second library 220 may load pieces of vehicle data, i.e., data frames, the previous or current decoding of which is completed, from the DB. The second library 220 may assist in performing comparison, review, and rule generation for the loaded data frames. The compare function may take charge of a comparison between a plurality of pieces of vehicle data. The compare function may also assist in visualizing vehicle data and checking the validity of data as an additional option. Furthermore, the compare function may decode only one piece of corresponding vehicle data and may export the decoded result when a single file, i.e., one piece of vehicle data, is imported. The review function may review the vehicle data decoded based on the rule written by the user and may export the reviewed result, e.g., "pass" or "fail." The rule generation function may automatically generate a new rule file capable of being reused, based on a master file including vehicle failure diagnosis information. Furthermore, the rule generation function may review vehicle data using the generated rule file and may export the reviewed result. The rule generation function may add the output reviewed result to the rule file.

Figure 3:
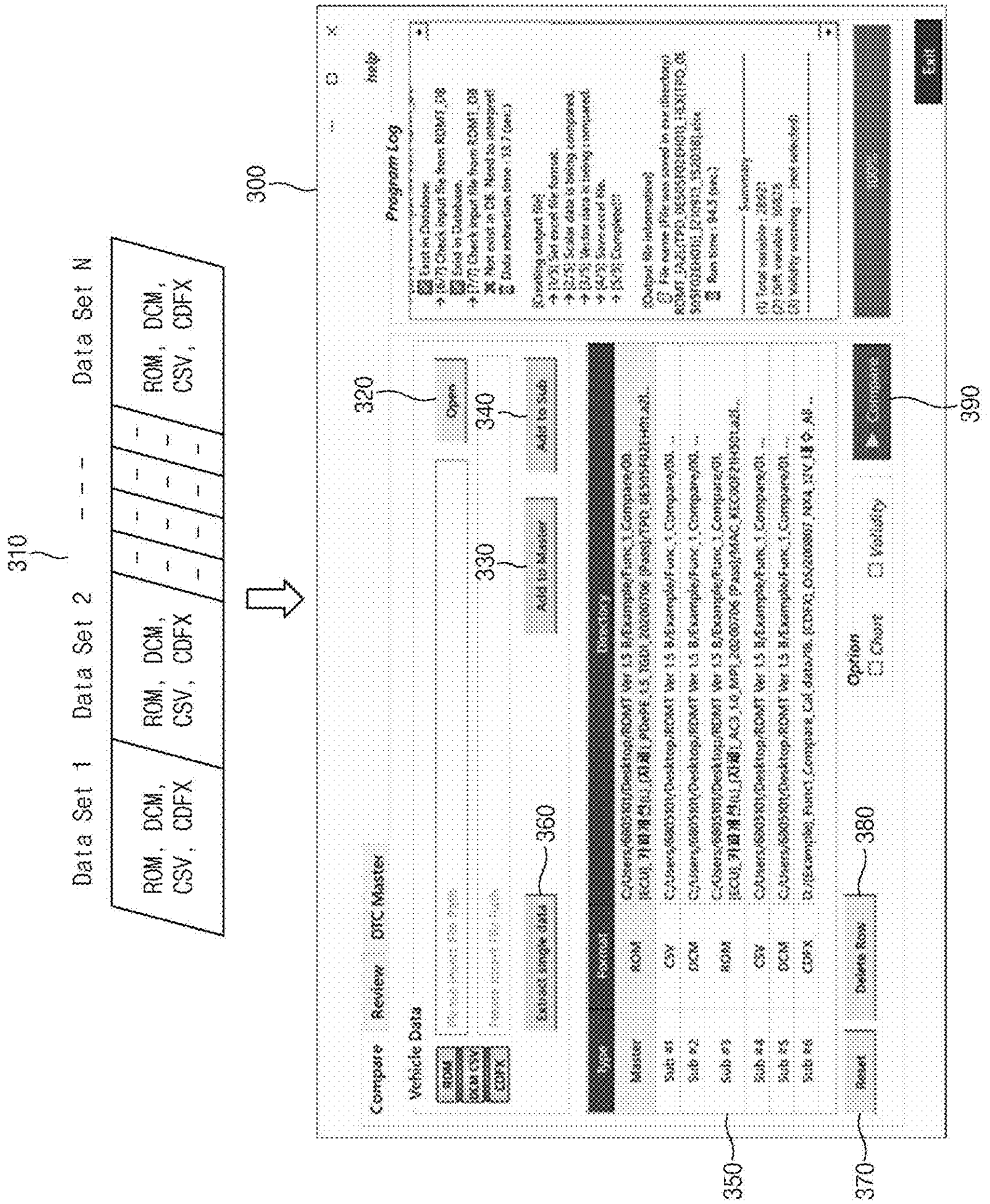
FIG. 3 is a drawing illustrating a screen where a vehicle data comparison function is executed according to an embodiment of the present disclosure.

FIG. 3 is a drawing illustrating a screen where a vehicle data comparison function is executed according to an embodiment of the present disclosure.

Referring to FIG. 3, when a vehicle data verification tool is executed, a processor 160 of FIG. 1 may output the corresponding execution screen on a display 150 of FIG. 1. When a "compare" tab is selected on the tool execution screen, the processor 160 may output a compare function execution screen 300 on the display 150.

The processor 160 may import at least one vehicle data set (e.g., Data Set 1, Data Set 2, . . . , and Data Set N) 310 on the compare function execution screen 300. In detail, when the user pushes an "open" button 320 to select a vehicle data file on the compare function execution screen 300, the processor 160 may read a file path of the vehicle data selected by the user.

Furthermore, when the user manipulates an "Add to Master" button 330 to select one vehicle data file (or master data) to be used as reference data and when the user manipulates an "Add to Sub" button 340 to select at least one vehicle data file (or sub-data) to be compared with the reference data, the processor 160 may identify a file format and a file path of the master data and the at least one sub-data to generate and display a file list 350 depending on a user selection (or input).

Furthermore, when the user selects an "Extract single data" button 360, the processor 160 may extract only single data.

When a "Reset" button 370 is manipulated by the user, the processor 160 may initialize the file list 350. When a "Delete Row" button 380 is pushed in a state where at least one item in the file list 350 is selected, the processor 160 may delete the at least one selected item.

When a "Chart" checkbox is selected among the options, the processor 160 may visualize and export pieces of vehicle data, i.e., master data and at least one sub-data, in the form of a graph.

When a "Validity" checkbox is selected among the options, the processor 160 may check the validity of the pieces of vehicle data and may visualize and export the result in the form of a table. The processor 160 may remove a calibration error capable of occurring in a vehicle development process in advance by checking the validity of data.

When a "compare" button 390 is manipulated by the user, the processor 160 may initiate a comparison between the master data and the at least one sub-data. The processor 160 may compare the at least one sub-data with respect to the master data. The processor 160 may compare all of the values of the vehicle variables in the at least one sub-data, which are matched with the vehicle variables in the master data. The processor 160 may determine "pass" when the vehicle variable value of the at least one sub-data is identical to the vehicle variable value of the master data. The processor 160 may determine "fail" when the vehicle variable value of the at least one sub-data is not identical to the vehicle variable value of the master data. For example, when a value of variable A of the master data is 100 and when all of the values of variables A of first sub-data, second sub-data, and third sub-data are 100, the processor 160 may determine "pass." However, when the value of variable A of the master data is 100 and when the values of variables A of the first sub-data, the second sub-data, and the third sub-data are 100, 90, and 100, respectively, the processor 160 may determine "fail."

The processor 160 may export the compared result (or calibration data) as a file (e.g., an Excel file) in the form of a table. The compared result file may include a variable name of a vehicle variable, a variable function classification, a variable description, a variable type, a variable unit, a compared result (i.e., whether they are identical to each other), a variable value (or an internal value), and/or the like.

Figure 4:
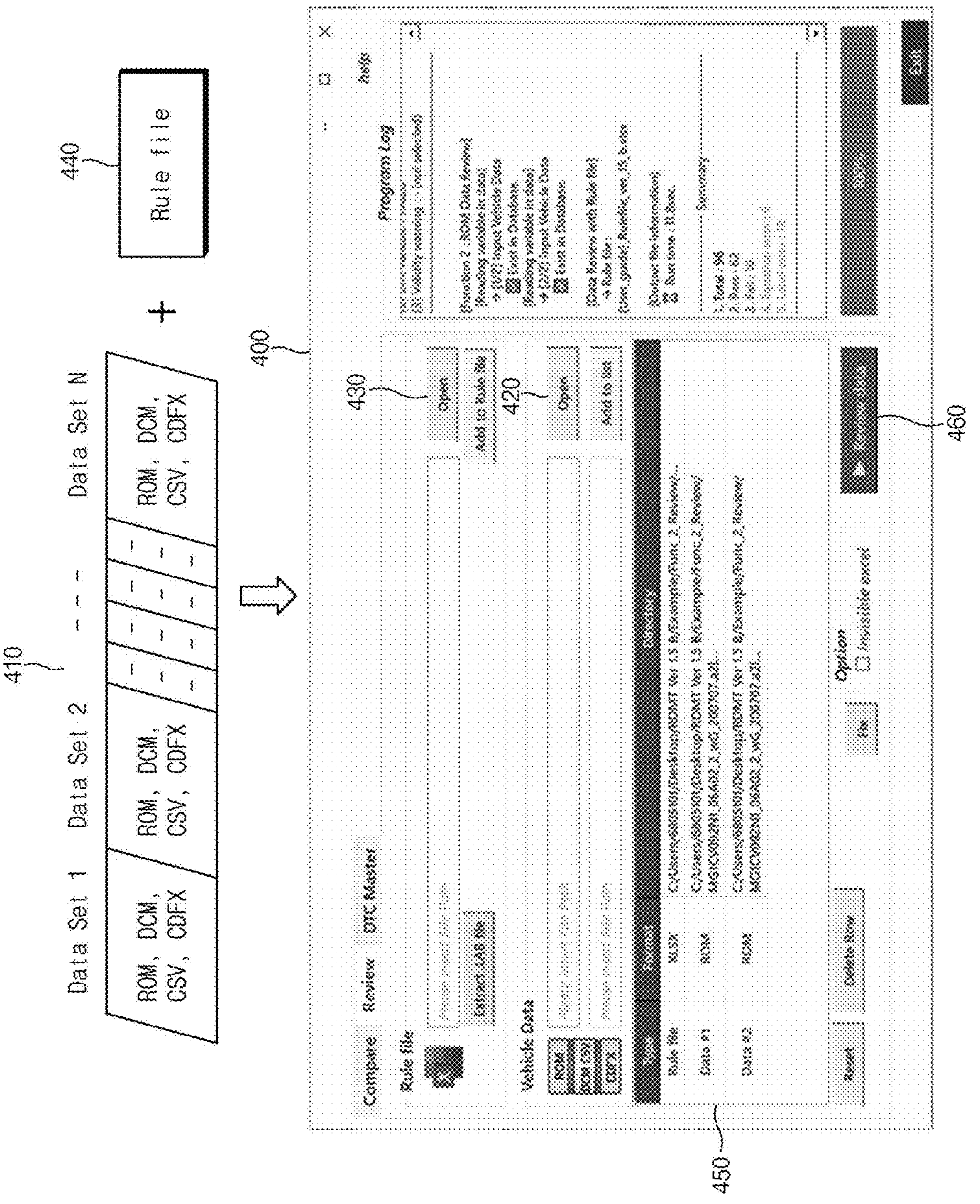
FIG. 4 is a drawing illustrating a screen where a vehicle data review function is executed according to another embodiment of the present disclosure.

FIG. 4 is a drawing illustrating a screen where a vehicle data review function is executed according to another embodiment of the present disclosure. FIG. 5 is a drawing illustrating operator information for writing a review formula according to another embodiment of the present disclosure.

When a vehicle data verification tool is executed, a processor 160 of FIG. 1 may output a corresponding execution screen on a display 150 of FIG. 1. When a "Review" tab is selected on the tool execution screen, the processor 160 may output a review function execution screen 400 on the display 150.

The processor 160 may import at least one vehicle data set (e.g., Data Set 1, Data Set 2, . . . , and Data Set N) 410 on the review function execution screen 400. When a user pushes an "open" button 420 to select vehicle data to be reviewed on the review function execution screen 400, the processor 160 may read a file path of the vehicle data selected by the user.

When the user pushes an "open" button 430 to select a rule file 440 on the review function execution screen 400, the processor 160 may import the rule file 440. The rule file 440 may include a review formula. The review formula may be written based on operator information for writing a review formula shown in FIG. 5.

The processor 160 may identify file formats and file paths of the imported rule file 440 and at least one ROM data 410 to generate a list 450. The processor 160 may then display the generated list 450.

Thereafter, when a "Review data" button 460 is pushed by the user, the processor 160 may review (or verify) ROM data based on a review formula (or a review rule) included in the rule file 440. For example, the processor 160 may perform the review formula for the ROM data to determine "true" or "false."

The herein-mentioned review function may function as a tool for transferring technology and know-how of a person in charge of development and may remove any human error in advance.

Figure 6:
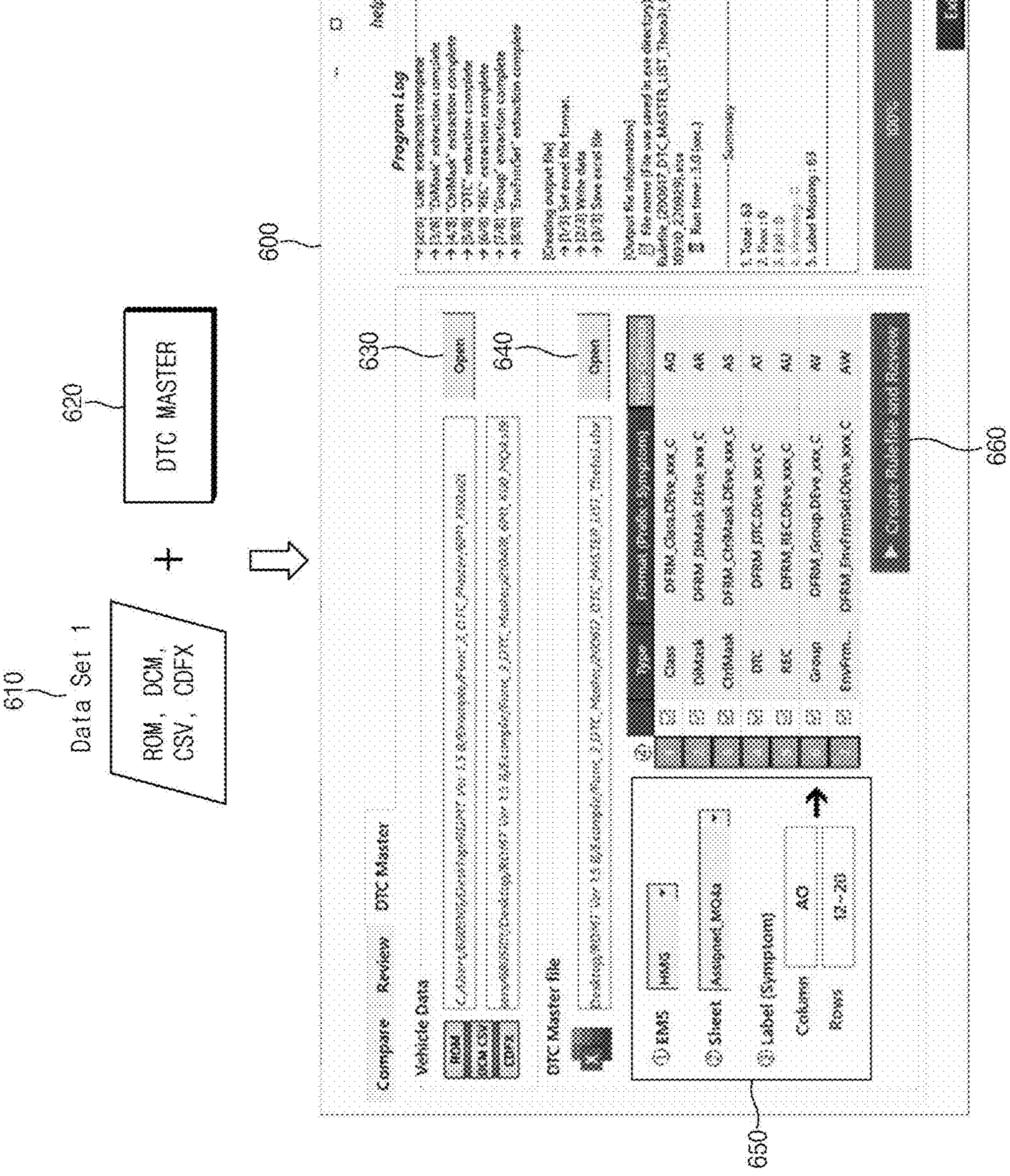
FIG. 6 is a drawing illustrating a screen where a rule generation function is executed according to another embodiment of the present disclosure.

FIG. 6 is a drawing illustrating a screen where a rule generation function is executed according to another embodiment of the present disclosure.

When a vehicle data verification tool is executed, a processor 160 of FIG. 1 may output a corresponding execution screen on a display 150 of FIG. 1. When a "DTC Master" tab is selected on the tool execution screen, the processor 160 may output a rule generation function execution screen 600 on the display 150.

The processor 160 may import at least one vehicle data set (e.g., Data Set 1) 610 and failure diagnosis standard information (or a DTC master) 620 on the rule generation function execution screen 600. When a user pushes "open" buttons 630 and 640 to select a vehicle data file and select a DTC master file on the rule generation function execution screen 600, the processor 160 may import the vehicle data file and the DTC master file selected by the user. The failure diagnosis standard information in the DTC master file may be changed in a flexible manner according to a sale area, a powertrain, option information, and the like of a vehicle.

When importing the vehicle data set 610 and the failure diagnosis standard information 620, the processor 160 may review the vehicle data set 610 and the failure diagnosis standard information 620 and may generate a reusable new rule file. Furthermore, the processor 160 may review whether the failure diagnosis standard information 620 and vehicle data in the vehicle data set 610 are identical to each other upon initial execution and may export the reviewed result together with newly generated rule information.

Furthermore, the processor 160 may generate information 650 of a specific position (i.e., specific rows and columns) in the DTC master file depending on a user input. The information 650 may include vehicle controller supplier information, sheet information, and label information.

When a "Create Rulefile and Review" button 660 is pushed by the user, the processor 160 may generate a reusable rule file based on the DTC master file 620 and may review vehicle data based on the generated rule file.

Figure 7:
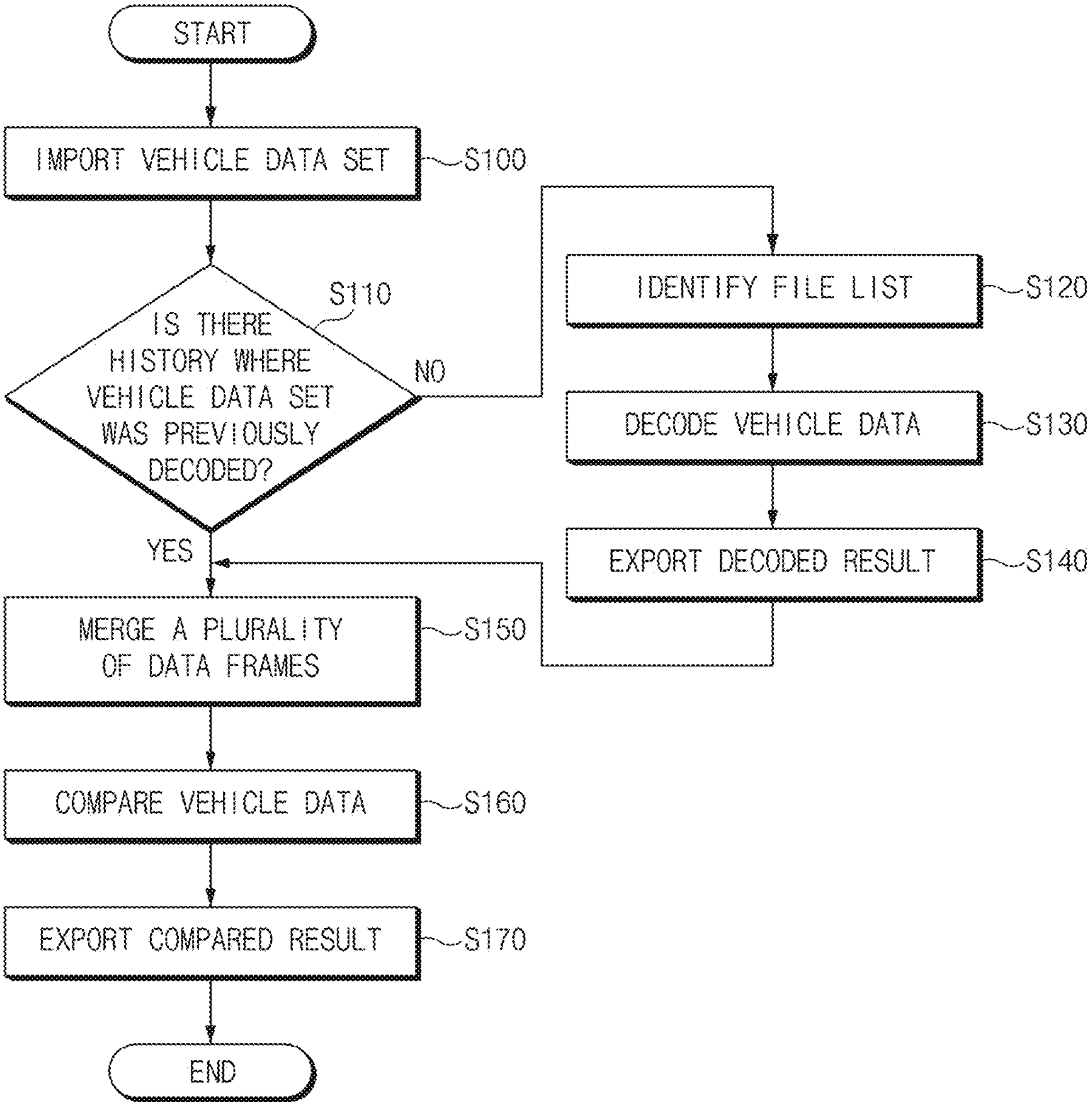
FIG. 7 is a flowchart illustrating a vehicle data verification method according to an embodiment of the present disclosure.

FIG. 7 is a flowchart illustrating a vehicle data verification method according to an embodiment of the present disclosure. The present embodiment describes that a processor 160 of FIG. 1 executes a vehicle data management tool to perform a vehicle data comparison function.

In S100, the processor 160 may import at least one vehicle data set. The processor 160 may receive at least one vehicle data set (or an input data set) from a communication module 110, an interface 130, or a memory 140 of FIG. 1 depending on a user input received from a user interface 120 of FIG. 1. Each of the at least one vehicle data set may include pieces of vehicle data having a file format such as ROM, DCM, CSV, and/or CDFX.

In S110, the processor 160 may identify whether there is a history where at least one vehicle data set was previously decoded. In other words, the processor 160 may identify whether the at least one vehicle data set is a data set that proceeded with being previously decoded. The processor 160 may determine whether there is a history where the at least one vehicle data set was previously decoded by identifying whether the at least one vehicle data set is in a DB. When there is the at least one vehicle data set in the DB, the processor 160 may determine that there is history where the at least one vehicle data set was previously decoded. When the at least one vehicle data set is not in the DB, the processor 160 may determine that there is no history where the at least one vehicle data set was previously decoded.

When it is identified that there is no history where the at least one vehicle data set was previously decoded in S110, the processor 160 may identify a list of vehicle data files included in the at least one vehicle data set in S120. The processor 160 may sequentially identify formats and/or paths of the vehicle data files in the at least one vehicle data set and may output the identified contents as text in the form of a list.

In S130, the processor 160 may proceed with decoding the vehicle data in the at least one vehicle data set using a first library 210 of FIG. 2. The processor 160 may decode ROM data, DCM data, CSV data, and/or CDFX data, which are/is vehicle data. The processor 160 may perform preprocessing for decoding the ROM data. The processor 160 may calculate eight predetermined functions for the ROM data in the preprocessing process to derive result values. Furthermore, the processor 160 may synthesize the derived result values. Additionally, the processor 160 may decode the synthesized result values.

In S140, the processor 160 may export the result of the decoded vehicle data. The processor 160 may generate and store the decoded result in the form of a data frame. The data frame may be defined in a predetermined standardized format (or a standard format) in advance. The processor 160 may merge the result of the decoded ROM data, the result of the decoded CSV data, the result of the decoded DCM data, and the result of the decoded CDFX data to generate a data frame. The processor 160 may store the generated data frame in the DB.

When it is identified that there is history where the at least one vehicle data set was previously decoded in S110 or after S140, the processor 160 may merge a plurality of data frames in S150.

In S160, the processor 160 may compare pieces of vehicle data in the merged data frame. The processor 160 may compare the pieces of vehicle data using a compare function in a second library 220 of FIG. 2.

In S170, the processor 160 may export the result of the compared pieces of vehicle data. The processor 160 may export the compared result in a predetermined file format.

Figure 8:
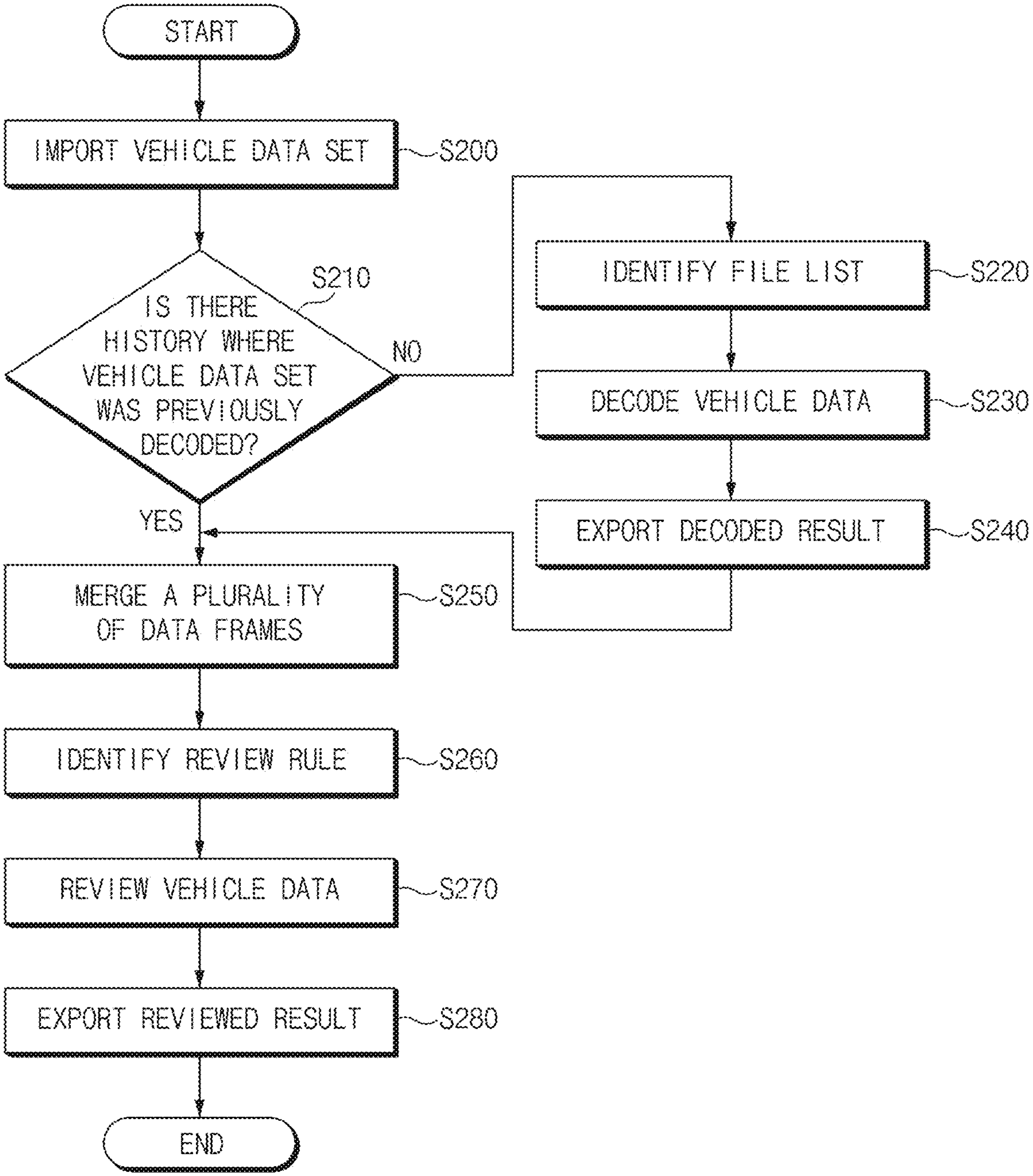
FIG. 8 is a flowchart illustrating a vehicle data verification method according to another embodiment of the present disclosure.

FIG. 8 is a flowchart illustrating a vehicle data verification method according to another embodiment of the present disclosure. The present embodiment describes that a processor 160 of FIG. 1 executes a vehicle data management tool to perform a vehicle data review function.

In S200, the processor 160 may import at least one vehicle data set. The processor 160 may receive at least one vehicle data set (or an input data set) from a communication module 110, an interface 130, or a memory 140 of FIG. 1 depending on a user input received from a user interface 120 of FIG. 1. Each of the at least one vehicle data set may include pieces of vehicle data having a file format such as ROM, DCM, CSV, and/or CDFX.

In S210, the processor 160 may identify whether there is a history where at least one vehicle data set was previously decoded. The processor 160 may determine whether there is history where the at least one vehicle data set was previously decoded by identifying whether the at least one vehicle data set is in a DB. When there is the at least one vehicle data set in the DB, the processor 160 may determine that there is history where the at least one vehicle data set was previously decoded. When the at least one vehicle data set is not in the DB, the processor 160 may determine that there is no history where the at least one vehicle data set was previously decoded.

When it is identified that there is no history where the at least one vehicle data set was previously decoded in S210, the processor 160 may identify a list of vehicle data files included in the at least one vehicle data set in S220. The processor 160 may sequentially identify formats and/or paths of the vehicle data files in the at least one vehicle data set and may export the identified contents as text in the form of a list.

In S230, the processor 160 may proceed with decoding the vehicle data in the at least one vehicle data set using a first library 210 of FIG. 2. The processor 160 may decode ROM data, DCM data, CSV data, and/or CDFX data, which are/is vehicle data. The processor 160 may perform preprocessing for decoding the ROM data. The processor 160 may calculate the eight predetermined functions for the ROM data in the preprocessing process to derive result values and may synthesize the derived result values. The processor 160 may decode the synthesized result values.

In S240, the processor 160 may export the result of the decoded vehicle data. The processor 160 may generate and store the decoded result in the form of a data frame. The data frame may be defined in a predetermined standardized format (or a standard format) in advance. The processor 160 may merge the result of the decoded ROM data, the result of the decoded CSV data, the result of the decoded DCM data, and the result of the decoded CDFX data to generate a data frame. The processor 160 may store the generated data frame in the DB.

When it is identified that there is the history where the at least one vehicle data set was previously decoded in S210 or after S240, the processor 160 may merge a plurality of data frames in S250.

In S260, the processor 160 may identify a review rule. The review rule may be written by a user and may be stored in the form of a file.

In S270, the processor 160 may review pieces of vehicle data in the merged data frame based on the identified review rule. The processor 160 may compare pieces of vehicle data using a review function in a second library 220 of FIG. 2.

In S280, the processor 160 may export the result of the reviewed pieces of vehicle data. The processor 160 may export the reviewed result in a predetermined file format.

Embodiments of the present disclosure may automatically decode and verify on board diagnostics (OBD) regulations and controller data.

Furthermore, embodiments of the present disclosure may be efficient and robust in a process of verifying vehicle data by internally decoding and comparing read-only memory (ROM) data.

Furthermore, embodiments of the present disclosure may standardize a verification task using each rule file and may ensure the reliability of the verification process.

Hereinabove, although the present disclosure has been described with reference to embodiments and the accompanying drawings, the present disclosure is not limited thereto. The embodiments described herein may be variously modified and altered by those having ordinary skill in the art to which the present disclosure pertains without departing from the spirit and scope of the present disclosure claimed in the following claims. Therefore, embodiments of the present disclosure are not intended to limit the technical spirit of the present disclosure but are provided only for illustrative purposes. The scope of the present disclosure should be construed based on the accompanying claims, and all the technical ideas within the scope equivalent to the claims should be included in the scope of the present disclosure.

What is claimed is:

1. A vehicle data verification apparatus comprising:
a database (DB); and
a processor connected with the DB, wherein the processor is configured to:
import at least one vehicle data set;
identify whether the at least one vehicle data set is stored in the DB;
preprocess read-only memory (ROM) data included in the at least one vehicle data set by coupling an A2L file and a Hex file, decode pieces of vehicle data including the preprocessed ROM data, and store the pieces of decoded vehicle data in the DB as a standardized data frame, upon identifying that the at least one vehicle data set is not stored in the DB;
verify pieces of vehicle data in the at least one vehicle data set stored in the DB; and
export a result of the verified pieces of vehicle data.

2. The vehicle data verification apparatus of claim 1, wherein the processor is further configured to:
set one of the pieces of vehicle data to reference data; and
compare the vehicle data set to the reference data for the other pieces of vehicle data.

3. The vehicle data verification apparatus of claim 2, wherein the processor is configured to visualize and export the pieces of vehicle data.

4. The vehicle data verification apparatus of claim 2, wherein the processor is configured to check a validity of the pieces of vehicle data.

5. The vehicle data verification apparatus of claim 1, wherein the processor is configured to import a review rule defined by a user.

6. The vehicle data verification apparatus of claim 5, wherein the processor is configured to review the pieces of vehicle data based on the review rule.

7. The vehicle data verification apparatus of claim 1, wherein the processor is configured to import failure diagnosis standard information.

8. The vehicle data verification apparatus of claim 7, wherein the processor is configured to review the pieces of vehicle data to generate a new review rule based on the failure diagnosis standard information.

9. The vehicle data verification apparatus of claim 8, wherein the new review rule includes the result of the reviewed pieces of vehicle data.

10. A vehicle data verification method comprising:
importing, by a processor, at least one vehicle data set;
identifying, by the processor, whether the at least one vehicle data set is stored in a database (DB);
preprocessing, by the processor, read-only memory (ROM) data included in the at least one vehicle data set by coupling an A2L file and a Hex file, upon identifying that the at least one vehicle data set is not stored in the DB;
decoding, by the processor, pieces of vehicle data including the preprocessed ROM data;
storing, by the processor, the pieces of decoded vehicle data in the DB as a standardized data frame;
verifying, by the processor, pieces of vehicle data in the at least one vehicle data set stored in the DB; and
exporting, by the processor, a result of verifying the pieces of vehicle data.

11. The vehicle data verification method of claim 10, wherein the verifying of the pieces of vehicle data includes:
setting, by the processor, one of the pieces of vehicle data to reference data; and
comparing, by the processor, the vehicle data set to the reference data for the other pieces of vehicle data.

12. The vehicle data verification method of claim 11, wherein the verifying of the pieces of vehicle data further includes:
visualizing and exporting, by the processor, the pieces of vehicle data.

13. The vehicle data verification method of claim 11, wherein the verifying of the pieces of vehicle data further includes:
checking, by the processor, a validity of the pieces of vehicle data.

14. The vehicle data verification method of claim 10, wherein the importing of the at least one vehicle data set includes:
importing, by the processor, a review rule defined by a user.

15. The vehicle data verification method of claim 14, wherein the verifying of the pieces of vehicle data includes:
reviewing, by the processor, the pieces of vehicle data based on the review rule.

16. The vehicle data verification method of claim 10, wherein the importing of the at least one vehicle data set includes:
importing, by the processor, failure diagnosis standard information.

17. The vehicle data verification method of claim 16, wherein the verifying of the pieces of vehicle data includes:
reviewing, by the processor, the pieces of vehicle data to generate a new review rule based on the failure diagnosis standard information.

* * * * *